(12) United States Patent
Nakamura

(10) Patent No.: US 7,212,233 B2
(45) Date of Patent: May 1, 2007

(54) IMAGE EXTRACTING APPARATUS AND IMAGE EXTRACTING METHOD

(75) Inventor: Kyoko Nakamura, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 929 days.

(21) Appl. No.: 09/879,909

(22) Filed: Jun. 14, 2001

(65) Prior Publication Data

US 2001/0053292 A1 Dec. 20, 2001

(30) Foreign Application Priority Data

Jun. 14, 2000 (JP) .............................. 2000-178230

(51) Int. Cl.
*H04N 5/235* (2006.01)
*G06K 9/00* (2006.01)
(52) U.S. Cl. .................... 348/221.1; 382/118
(58) Field of Classification Search ..................... None
See application file for complete search history.

(56) References Cited

U.S. PATENT DOCUMENTS 5,283,644 A * 2/1994 Maeno ....................... 348/152
6,038,333 A * 3/2000 Wang ......................... 382/118
6,128,397 A * 10/2000 Baluja et al. ............... 382/118
6,144,755 A * 11/2000 Niyogi et al. ............... 382/118
6,671,391 B1 * 12/2003 Zhang et al. ............... 382/118
6,816,611 B1 * 11/2004 Hagiwara et al. ........... 382/165

FOREIGN PATENT DOCUMENTS

JP          8-126034          5/1996

* cited by examiner

*Primary Examiner*—David Ometz
*Assistant Examiner*—Luong T. Nguyen
(74) *Attorney, Agent, or Firm*—McDermott Will & Emery LLP

(57) ABSTRACT

An image extracting apparatus includes an image database in which a plurality of images are stored, a detecting portion which detects the orientation of a subject in an image, and an extracting portion which extracts an image including a subject in a predetermined orientation from the image database based on the result of the detection by the detecting portion.

8 Claims, 14 Drawing Sheets

IMAGE EXTRACTING APPARATUS AND IMAGE EXTRACTING METHOD

RELATED APPLICATION

This application is based on application No. 2000-178230 filed in Japan, the entire content of which is hereby incorporated by reference.

BACKGROUND OF THE INVENTION

1. Field of the Invention

The present invention relates to a technology to extract a desired image.

2. Description of the Related Art

Conventionally, as cameras for taking pictures, film-based cameras and digital still cameras have become widespread. With these cameras, a subject in a desired pose can be shot by situating the subject within the frame and depressing the shutter button at the moment when the subject strikes the desired pose.

In taking a picture, when the subject is stationary, it is necessary to pay attention only to situating the stationary subject within the frame in good balance. However, when the subject is moving, it is necessary to depress the shutter button at the moment when the moving subject strikes a desired pose or makes a desired facial expression.

However, it is sometimes difficult to depress the shutter button at the moment when the moving subject strikes a predetermined pose or makes a predetermined facial expression. For example, when the subject is an infant, problems arise such that when shooting is performed at a small distance from the infant, his natural facial expression cannot be shot because he is conscious of the camera and that the user misses depressing the shutter button at the moment when the infant turns his eyes on the camera because the infant is moving fast and the user's attention is therefore directed to situating the infant within the frame.

When a group photo is taken with two or more children as the subjects, it is difficult to make all the children to strike a pose facing toward the front, and it is difficult to depress the shutter button at the moment when all the children face toward the front.

SUMMARY OF THE INVENTION

An object of the present invention is to solve the above-mentioned problems.

Another object of the present invention is to provide an image extracting apparatus or an image extracting method capable of obtaining an image in which the subject is in a desired pose.

Still another object of the present invention is to provide an image extracting apparatus or an image extracting method capable of obtaining from a moving image a still image in which the subject is in a desired pose.

Still another object of the present invention is to provide an image extracting apparatus or an image extracting method preventing a good moment for picturization from being missed to obtain an image in which the subject is in a desired pose.

Still another object of the present invention is to provide an image extracting apparatus capable of obtaining an image in which a predetermined number of subjects are in a desired pose when a plurality of subjects is shot.

These and other objects are attained by an image extracting apparatus comprising: an acquiring portion which acquires a plurality of signals each representative of an image of one or more subjects; a determining portion which determines orientations the subjects based on each of the signals; and an extracting portion which extracts a predetermined signal from among the signals based on the determination.

Moreover, the above-mentioned objects of the present invention are attained by an image extracting apparatus comprising: an acquiring portion which acquires a plurality of image signals generated by continuously shooting a subject for which a predetermined orientation is defined; a determining portion which determines an orientation of the subject in each of the images; and an extracting portion which extracts an image signal in which the subject is in a specified orientation, from among the acquired image signals based on the determination.

Moreover, the above-mentioned objects of the present invention are attained by an image extracting method comprising the steps of: accepting a specification about an orientation; successively generating a signal by photoelectrically converting at predetermined time intervals an optical image of a subject for which a predetermined orientation is defined; successively determining whether the orientation of the subject represented by the generated signal is a specified orientation or not in response to the successive signal generation; and recording a signal determined to be representative of the specified orientation onto a recording medium, wherein by this recording, a subject in the specified orientation is pasteurized.

Moreover, the above-mentioned objects of the present invention are attained by an image extracting method comprising the steps of: accepting a specification about an orientation; successively acquiring a plurality of image signals representative of an object of a predetermined orientation from a database in which the image signals are stored; successively determining whether the orientation of the object represented by the acquired signal is a specified orientation or not in response to the successive signal acquisition; and displaying, by use of a signal determined to be representative of the specified orientation, an image represented by the signal.

Moreover, the above-mentioned objects of the present invention are attained by an image extracting method comprising the steps of: accepting a specification about an orientation and a specification about a number; successively generating a signal by photoelectrically converting at predetermined time intervals an optical image including a plurality of subjects of the specified orientation; successively determining whether the orientation of each of the subjects represented by the generated signal is the specified orientation or not in response to the successive signal generation; determining whether at least a specified number of subjects determined to be in the specified orientation are included or not; and recording the signal determined to include at least the specified number of subjects onto a recording medium, wherein by this recording, at least the specified number of subjects in the specified orientation are shot.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENTS

Hereinafter, embodiments of the present invention will be described with reference to the drawings. In the figures, like reference numbers represent like or corresponding members, and descriptions thereof will not be repeated. In the present invention, to picturize means to capture an image of a subject, perform a determination according to the present invention on the captured image, extract the image based on the determination and output the extracted image by a predetermined method. Therefore, when the present invention is carried out by use of a digital camera for picturization, the picturization means not only a process of generating an image signal corresponding to an optical image through photoelectric conversion. In that case, the picturization also includes a process of recording the generated image signal onto a recording medium.

[Embodiment]

A first embodiment is suitable for a case where the subject is one person's face. Images of the subject are successively captured by a digital camera. The orientations of the subject included in the captured images are successively detected. When the subject is in a desired orientation, the image is recorded onto a recording medium.

Figure 1:
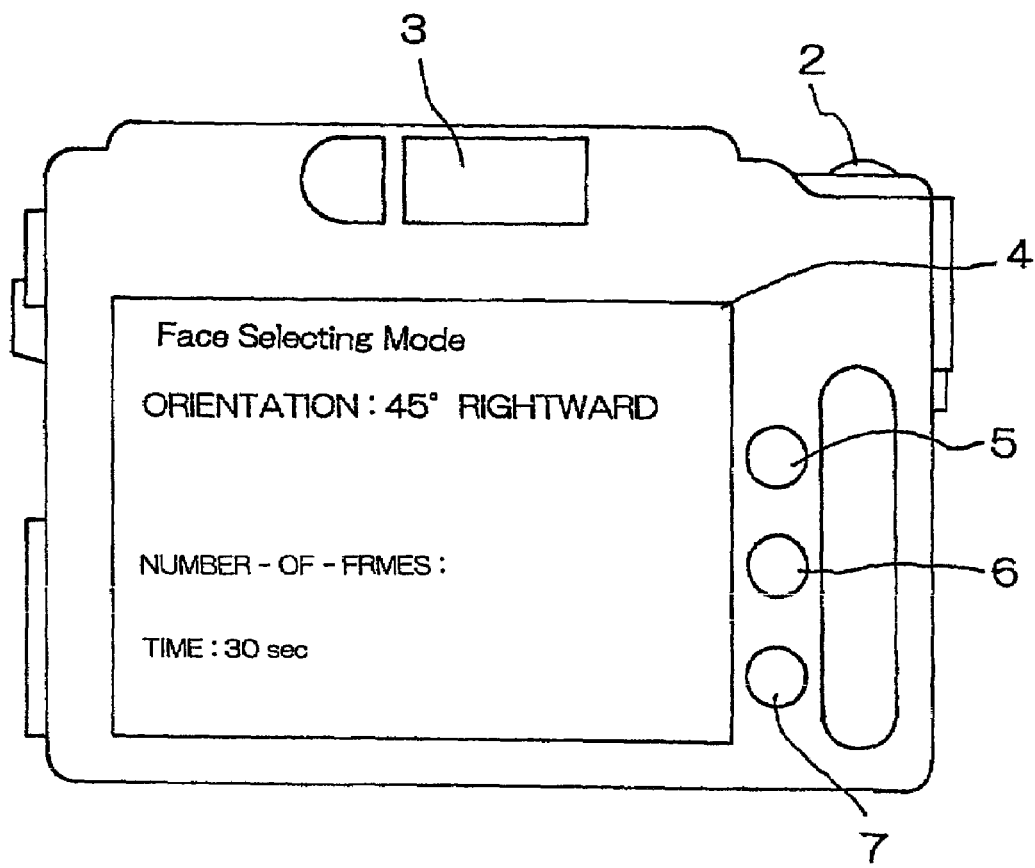
FIG. 1 is a rear view of a camera 100 of a first embodiment of the present invention.

FIG. 1 is a rear view of a camera of a first embodiment of the present invention. The camera 100 of this embodiment includes a shutter button 2, a liquid crystal display 4 for displaying various pieces of information, a viewfinder 3, a function switching button 5, an orientation specifying button 6, and a number-of-persons setting button 7.

The function switching button 5 is a button switch for switching functions of the camera such as switching between use and nonuse of the flash and switching between use and nonuse of the self-timer. Switching between a normal shooting mode and a face picturizing mode can be made by use of the function switching button 5. In the normal shooting mode, the subject is shot in response to a depression of the shutter button 2. In the face picturizing mode, although details thereof will be described later, the subject is picturized on condition that the subject strikes a desired pose. In addition, in the face picturizing mode, a number-of-frames priority mode or a time priority mode can be specified. This specification is also performed by the function switching button 5.

The orientation specifying button 6 is a button switch for setting the pose of the subject, particularly, the orientation of the subject's face when the camera 100 is in the face picturizing mode. The orientation of the subject's face is determined by the relative position relationship between the subject's face and the camera 100. More specifically, the orientation of the subject's face is determined by the direction from the subject to the camera such as when the subject faces toward the camera 100 or when the subject's head is turned 90° leftward or rightward from the direction to the camera 100. The angle of the face of the subject image included in the picturized image can be specified by the orientation specifying button 6.

The liquid crystal display 4 displays the image to be picturized, when the camera 100 is in the face picturizing mode. With this, the subject's pose can be confirmed by viewing the liquid crystal display 4. The liquid crystal display 4 also displays various setting conditions such as the remaining number of frames and the set shooting mode, the current time and the like. While the liquid crystal display 4 is provided on the back of the camera 100, display may be provided within the viewfinder 3.

Figure 2:
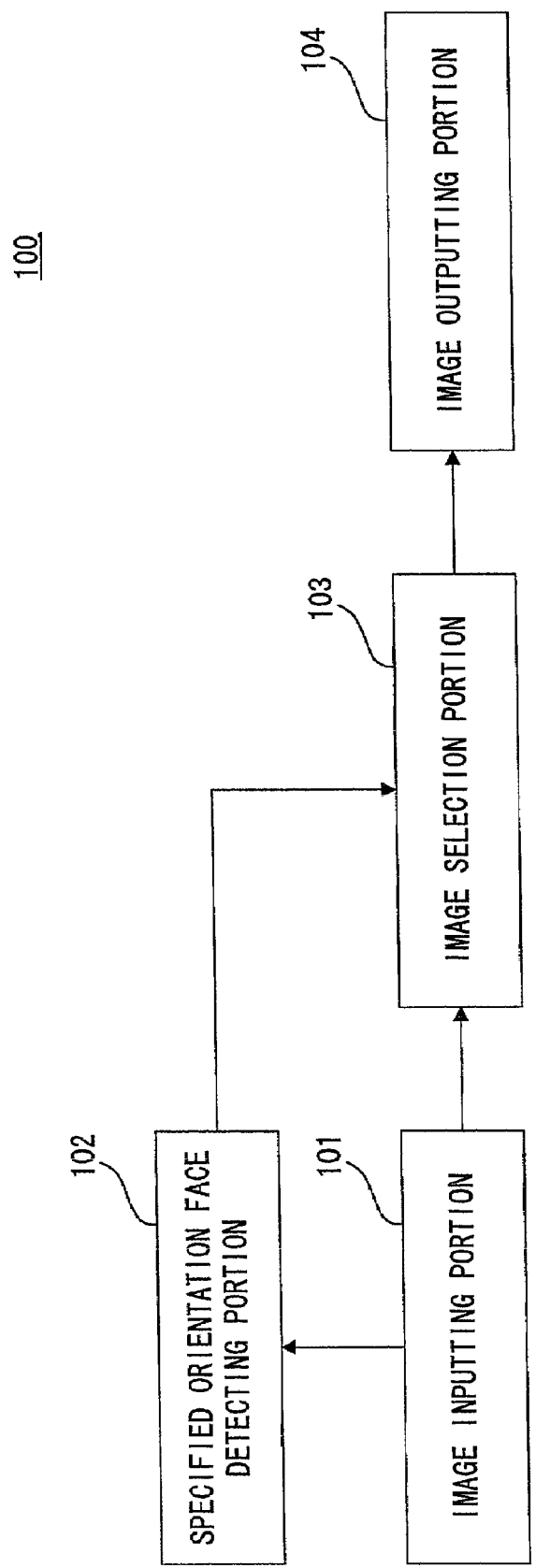
FIG. 2 is a function block diagram showing functions of the camera 100 of the first embodiment.

FIG. 2 is a function block diagram showing functions of the camera 100 of the first embodiment. Referring to FIG. 2, the camera 100 of this embodiment includes an image inputting portion 101 for inputting images, a specified orientation face detecting portion 102 for detecting the orientations of the faces of the subject images included in the input images, an image selecting portion 103 for selecting an image including a subject image that is in a predetermined orientation from among the input images, and an image outputting portion 104 for outputting the selected image.

The image inputting portion 101 is a light receiving device such as a charge coupled device (CCD), and outputs image data to the specified orientation face detecting portion 102 and the image selecting portion 103. The specified orientation face detecting portion 102 detects a subject image that is in a specified orientation by detecting the orientations of the faces of the subject images included in the images received from the image inputting portion 101. Here, the specified orientation is determined by the relative positions of the subject and the camera: a frontal face when the subject faces toward the camera; a face in full profile when the subject turns his head 90° leftward or rightward from the camera; and a face in half profile when the subject turns his head 45° leftward or rightward from the camera. The orientation is specified by the orientation specifying button 6 as an angle through which the subject turns his head from the camera.

The specified orientation face detecting portion 102 detects a face that is in the specified orientation predetermined by the orientation specifying button 6. When the subject in an image is in the specified orientation, a predetermined signal is output to the image selecting portion 103, so that the image picturized by the image inputting portion 101 is selected and output to the image outputting portion 104. The image outputting portion 104 may be the liquid crystal display 4, or may be a semiconductor memory.

Moreover, the image outputting portion 104 may be an apparatus that exposes silver halide film.

Figure 3:
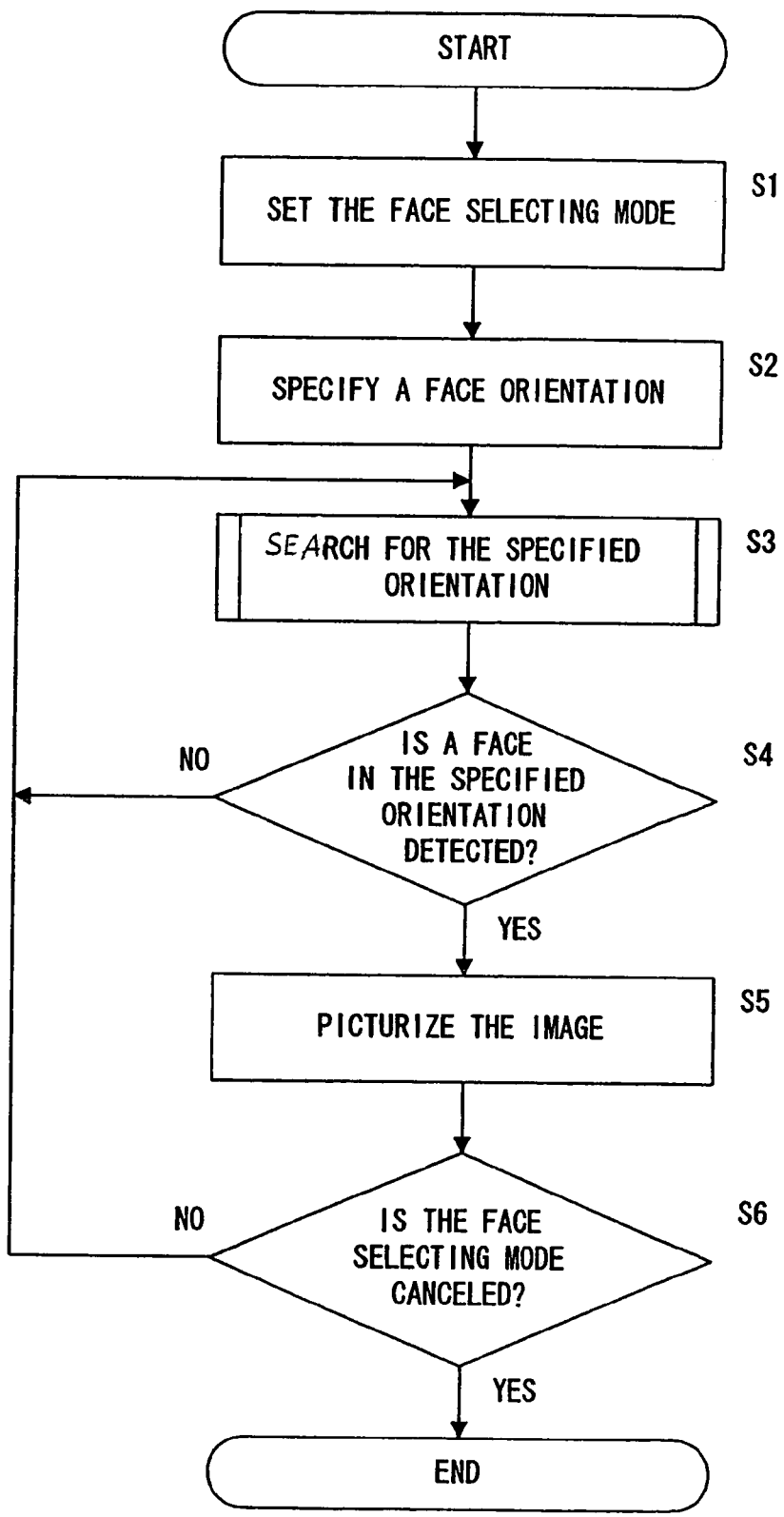
FIG. 3 is a flowchart of a picturization processing performed when the camera of the first embodiment is in a face selecting mode.

Next, a picturization processing performed when the camera 100 is in a face selecting mode will be described. The camera 100 is placed in the face selecting mode by depressing the function switching button 5. FIG. 3 is a flowchart of the picturization processing performed when the camera 100 of the first embodiment is in the face selecting mode. Referring to FIG. 3, first, the camera 100 is placed in the face selecting mode (step S1). The setting of the face selecting mode is performed by depressing the function switching button 5.

Then, a face orientation is specified (step S2). A display prompting the user to specify a face orientation is provided on the liquid crystal 4, and a face orientation is specified by depressing the orientation specifying button 6. The face orientation specified at this step is the specified orientation. The specified orientation is specified by the orientation specifying button 6 as an angle through which the subject turns his head from the camera. For example, the specified orientation is changed to the front, 45° rightward, 90° rightward, 45° leftward and 90° leftward in this order every time the orientation specifying button 6 is depressed, and is selected.

Then, a face that is in the specified orientation is searched for (step S3). Whether a subject image whose face is in the orientation specified at step S2 is included in images or not is determined. This will be concretely described later.

Then, whether a subject image whose face is in the specified orientation is detected or not is determined (step S4). When such a subject image is detected, the process proceeds to step S5. When a subject image whose face is in the specified orientation is not detected, the process proceeds to step S3 to repeat the processing until a subject image whose face is in the specified orientation is detected.

At step S5, the image picturized by the image inputting portion 101 is selected by the image selecting portion 103 and output to the image outputting portion 104. By this, the picturization processing is performed.

Then, whether the face selecting mode is canceled or not is determined (step S6). When it is canceled, the processing is ended, and when it is not canceled, the process proceeds to step S3.

The face selecting mode comprises two modes, the number-of-frames priority mode and the time priority mode. In the number-of-frames priority mode, the face selecting mode is canceled on condition that a predetermined number of images have been selected by the image selecting portion 103. In the time priority mode, the face selecting mode is canceled on condition that a predetermined time has elapsed since the camera 100 was placed in the face selecting mode. In the time priority mode, by step S6 being an interrupt processing, there can be cases where no image is selected by the image selecting portion 103 even when a subject image whose face is in the specified orientation is not detected at step S4.

Next, techniques for detecting a face in a predetermined orientation from images will be described. There are two techniques for detecting the orientation of the face of a subject image included in an image: a technique using neural networks; and a technique using a probability model. The technique using neural networks is described in H. A. Rowley, "Neutral Network-Based Learning for View-Based Human Face Detection," CMU-CS-99-117, 1999. The technique using a probability model is described in H. Schneiderman, and T. Kanade, "Probabilistic Modeling of Local Appearance and Spatial Relationships for Object Recognition," CVPR98. In the camera 100 of this embodiment, either of these techniques may be employed.

[Technique Using Neutral Networks]

Figure 4:
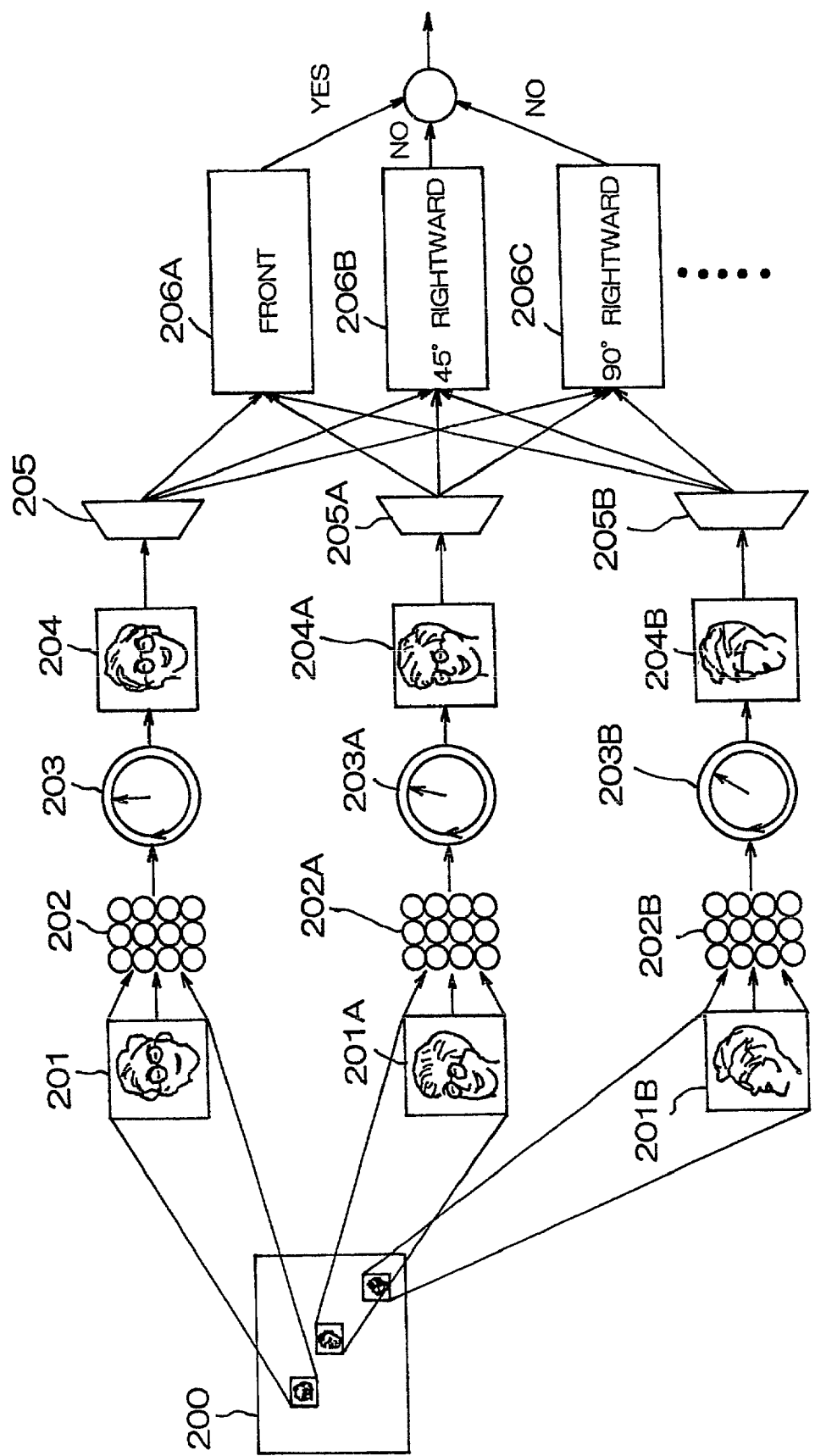
FIG. 4 is a view of assistance in explaining the principle of a technique using neural networks.

FIG. 4 is a view of assistance in explaining the principle of the technique using neural networks. The technique using neural networks uses two kinds of networks, a pose estimation network and a face detection network. The face detection network is provided for each of a plurality of categories into which faces are classified based on the angles through which the faces are turned in the horizontal direction from the front. The categories are called face orientation categories.

Here, the front indicates a case where the subject faces toward the camera 100. The face orientation categories are classified based on how much the subject's face is turned in the horizontal direction from the front. The face orientation categories are categories of the face detection network.

In FIG. 4, a face detection network 206A is a category when the subject's face looks toward the front (frontal category), a face detection network 206B is a category when the subject's face is turned 45° rightward from the front (45° rightward category), and a face detection network 206C is a category when the subject's face is turned 90° rightward from the front (90° rightward category). Like this, the face detection networks 206A, 206B and 206C are provided for the categories, respectively.

The pose estimation network outputs, for an input image, the angle of rotation within the plane of the image from an upright orientation, and the category of the face detection network. The plane of the image from an upright orientation is a plane whose normal is a straight line connecting the camera and the subject. The angle of rotation within the plane of the image is the angle of rotation about the normal. Therefore, the angle of rotation within the plane of the image from an upright orientation is, for example in a case where the subject is a person, the angle of rotation of the face when the subject tilts his head.

Figure 5:
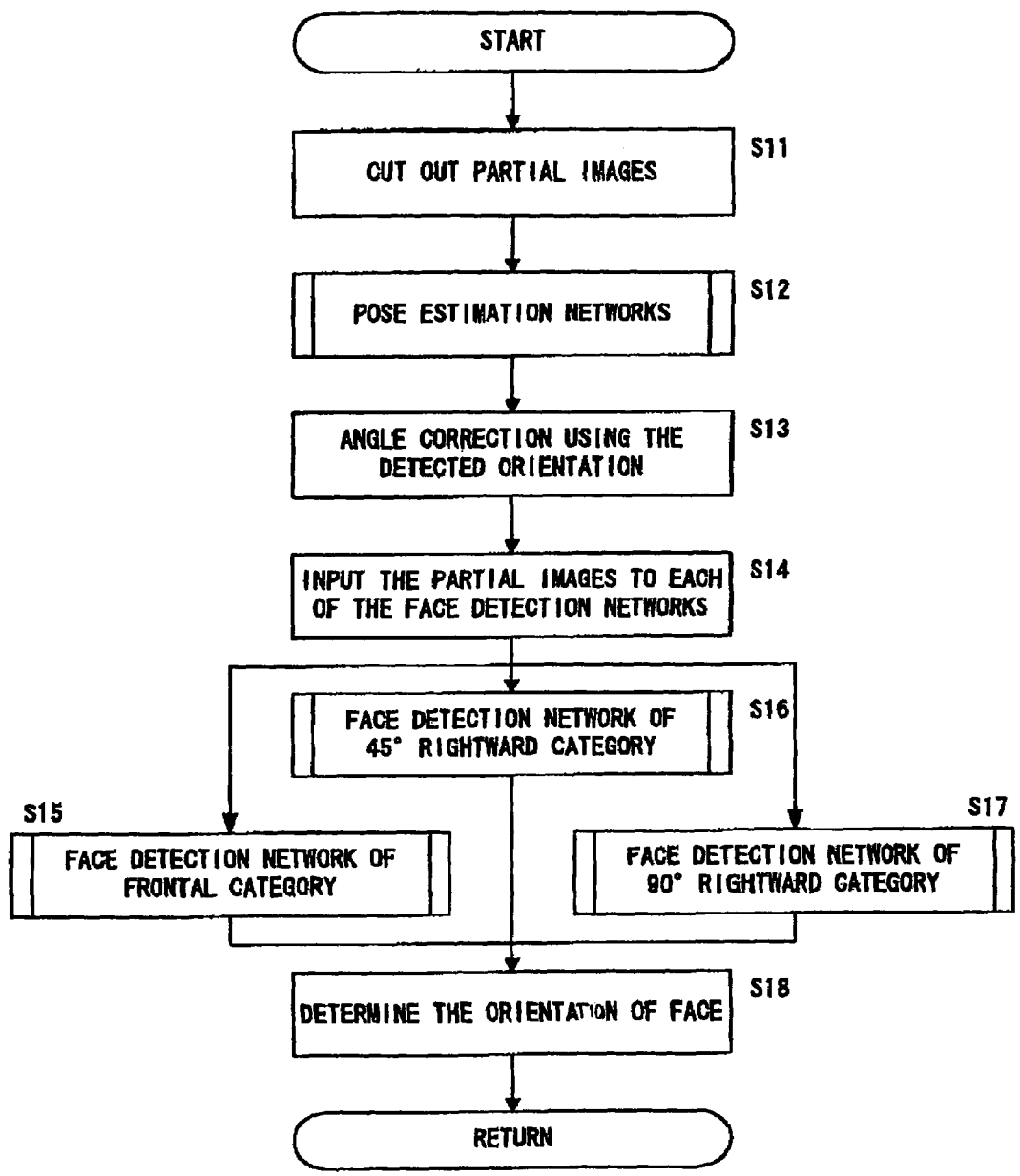
FIG. 5 is a flowchart of a processing to determine the orientations of faces in an image.

FIG. 5 is a flowchart of a processing to determine the orientations of faces in an image. The technique using neural networks will be described with reference to the principle view of FIG. 4 and the flowchart of FIG. 5. Referring to FIGS. 4 and 5, partial images 201, 201A and 201B including face images are cut out from an input image 200 (step S11). Here, an example is shown in which the partial image 201 includes a frontal face image, the partial image 201A includes a face image turned 45° rightward, and the partial image 201B includes a face image turned 90° rightward. The cut out partial images 201, 201A and 201B are input to pose estimation networks 202, 202A and 202B (step S12).

The pose estimation networks 202, 202A and 202B output, for the face images included in the input partial images 201, 201A and 201B, the angles of rotation within the plane of the image from an upright orientation and the categories of the face detection network. Then, by use of the angles of rotation within the plane of the image from an upright orientation 203, 203A and 203B detected by the pose estimation networks 202, 202A and 202B, the face images included in the partial images 201, 201A and 201B are angle-corrected so as to be in an upright orientation (step S13). Consequently, the rotation within the plane of the image from an upright orientation is corrected, so that the orientations of the faces can be determined more accurately.

Then, corrected partial images 204, 204A and 204B are respectively input to each of the face detection networks 206A, 206B and 206C (step S14).

This is for the following reason: When the partial images 204, 204A and 204B are input to the face detection networks 206A, 206B and 206C, the orientations of the face images included in the partial images 204, 204A and 204B are unknown. Therefore, at this point of time, the partial images 204, 204A and 204B are input to the provided face detection networks of all the orientations to determine the orientations of the faces in the partial images 204, 204A and 204B.

In each of the face detection networks 206, 206A and 206B, whether the subject image included in the input partial image is a face or not is determined (steps S15, S16 and S17). Consequently, the orientation of the face detection network where the subject image is determined to be a face is determined to be the orientation of the face included in the partial image (step S18). For example, when an image of a frontal face is input to the frontal face detection network, the input image is determined to be a face, and the face in the image is determined to be a frontal face. On the contrary, when a face turned 45° is input to the frontal face detection network, the face is not determined to be a face.

When the result of the output from the face detection network is such that the subject image is not a face, it is determined that the subject image included in the partial image 201, 201A or 201B is not a face image or that the orientation is erroneous. In this manner, the orientations of the faces of the subject images included in the partial images of the input image 200 are obtained.

[Technique Using Probability Model]

The technique using a probability model is to determine whether a given region is a face in a specified orientation or not by comparing the posterior probability that the region is a class of a face in the specified orientation and the posterior probability that the region is not the class of a face in the specified direction. In actuality, by use of the Bayes rule, the ratio between the likelihoods of two classes is calculated, and thresholding is performed. The posterior probabilities of the classes are simplified starting with a general form, and are converted into a form of a probability model having a calculable multiplicity.

Figure 6:
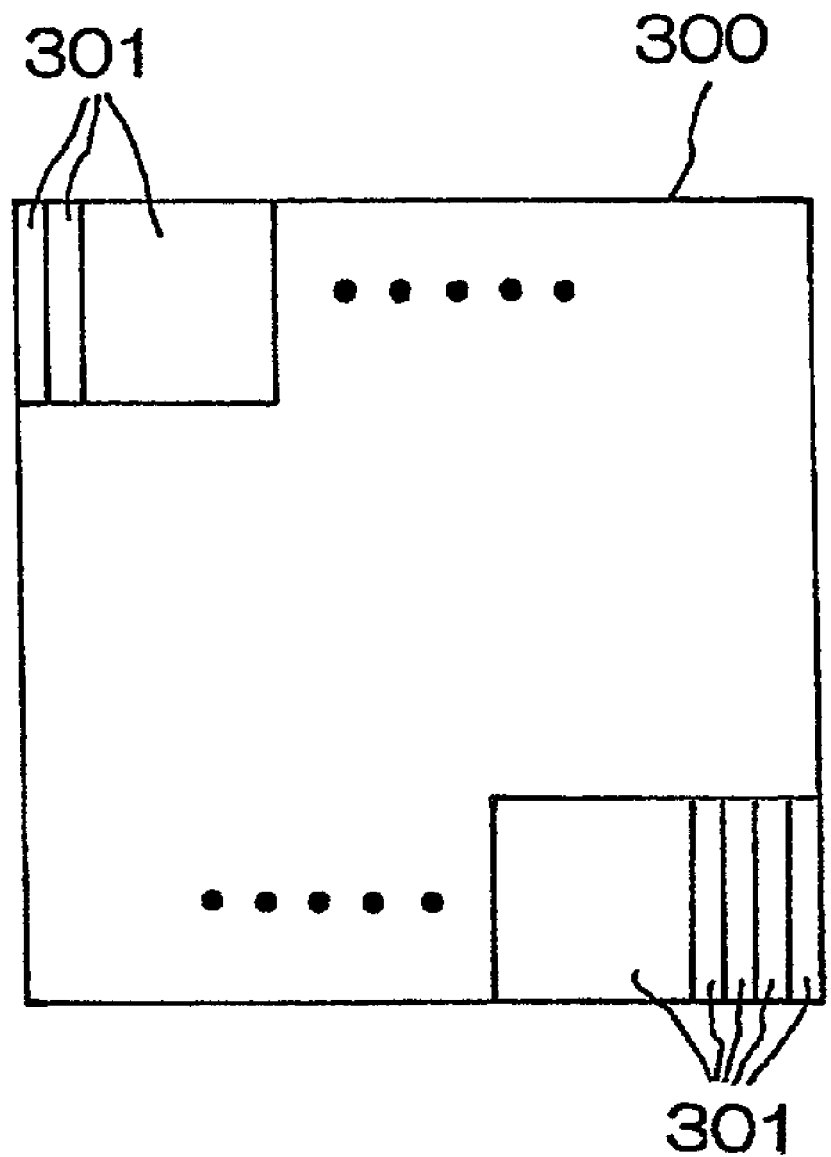
FIG. 6 is a view of assistance in explaining the principle of a learning processing in a technique using a probability model.

FIG. 6 is a view of assistance in explaining the principle of a learning processing in the technique using a probability model. Referring to FIG. 6, an input image 300 for learning is divided into overlapping partial images 301, and the connection rate distribution of the positions and the texture features of the partial images 301 are calculated for each category. The texture feature is expressed in a compressed and quantized data form, and the probability is calculated by counting the frequency of occurrence of a specific texture in a specific position in the entire area of the input image 300 for learning.

The learning processing is a processing to obtain the probability that a specific texture occurs in a specific position for both a case where the input image 300 includes a face in a specified orientation and a case where the input image 300 does not include a face in the specified orientation, that is, a processing to count the frequency of occurrence of a specific texture feature in the positions of the partial images 301 in the input image 300 that has been found to include a face, and previously obtain the probability thereof.

Learning is performed in a similar manner when the input image 300 does not include a face in the specified orientation. The texture feature of each partial image 301 undergoes dimensional compression by a principal component analysis, and is expressed in a compressed and quantized form projected on a low-level space.

Figure 7:
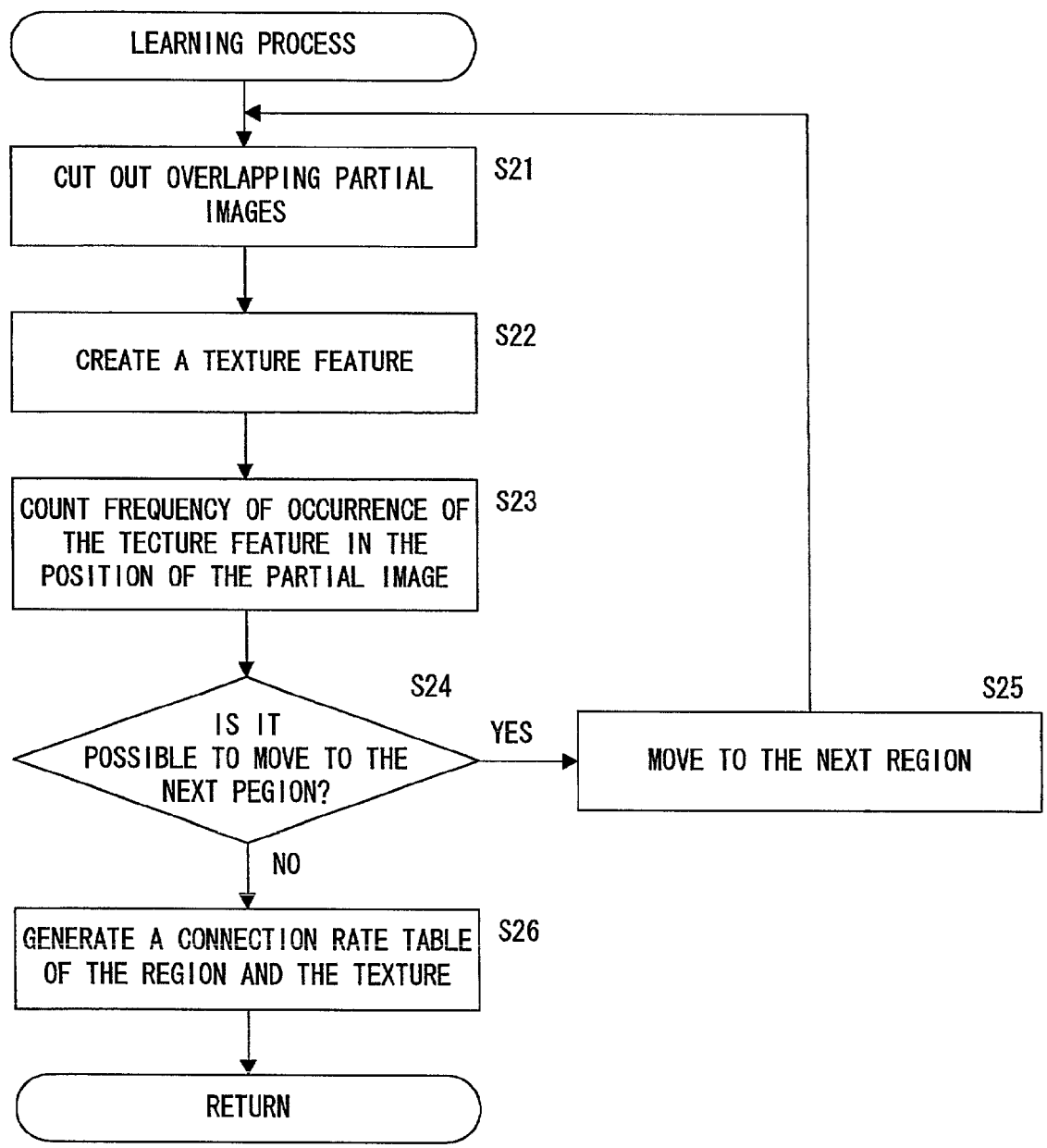
FIG. 7 is a flowchart of the learning processing.

FIG. 7 is a flowchart of the learning processing. Referring to FIGS. 6 and 7, the overlapping partial images 301 are cut out from the input image 300 (step S21).

Then, a specific texture feature is created (step S22) Then, the frequency of occurrence of the texture feature in the position of a partial image 301 in the input image 300 is counted (step S23).

Then, whether it is possible to move to the next partial image 301 or not is determined (step S24), and when it is possible, the process moves to the next region (step S25). A case where it is possible to move to the next region is a case where a partial image 301 to be processed is present, and a case where it is impossible to move to the next region is a case where no partial image 301 to be processed is present. When it is impossible to move to the next region, a connection rate table of the region and the texture is generated (step S26). The connection rate table thus obtained is used for a recognition processing described next.

Figure 8:
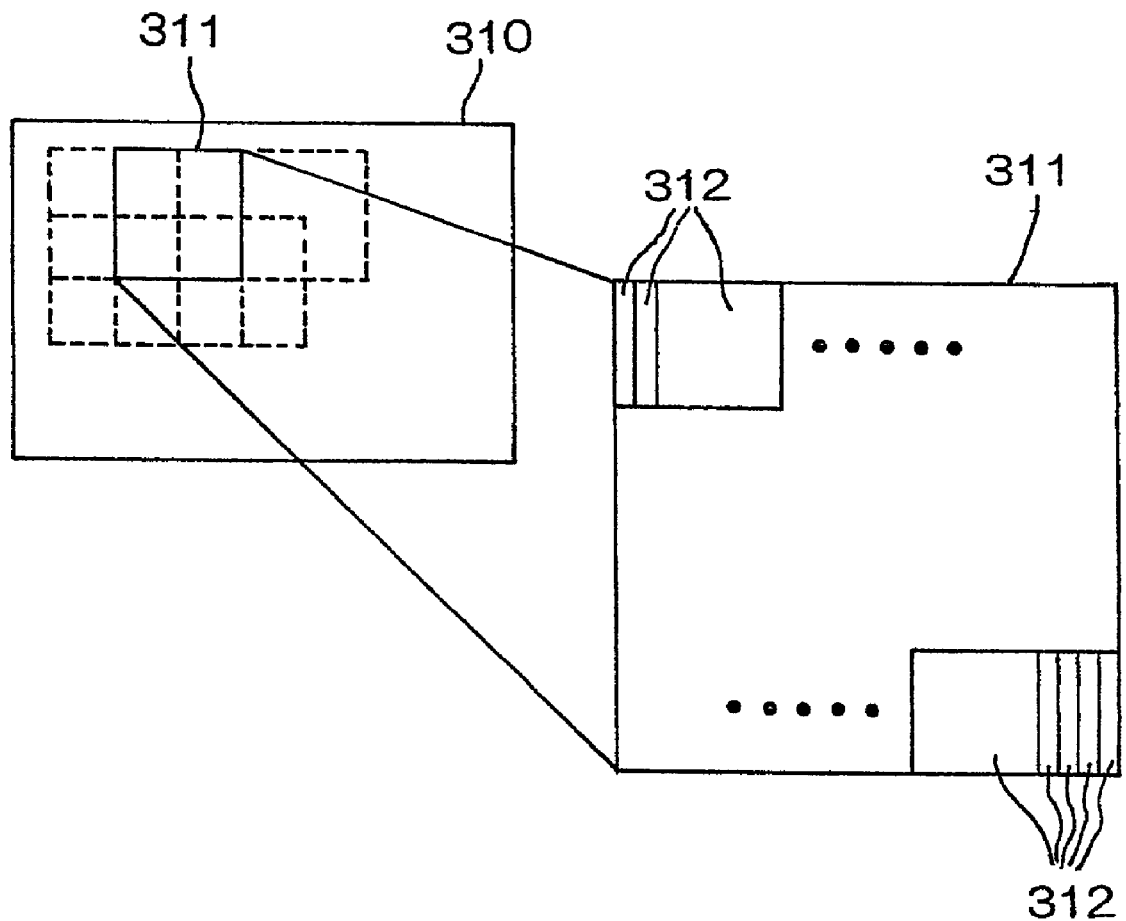
FIG. 8 is a schematic view of assistance in explaining the principle of a recognition processing.
Figure 9:
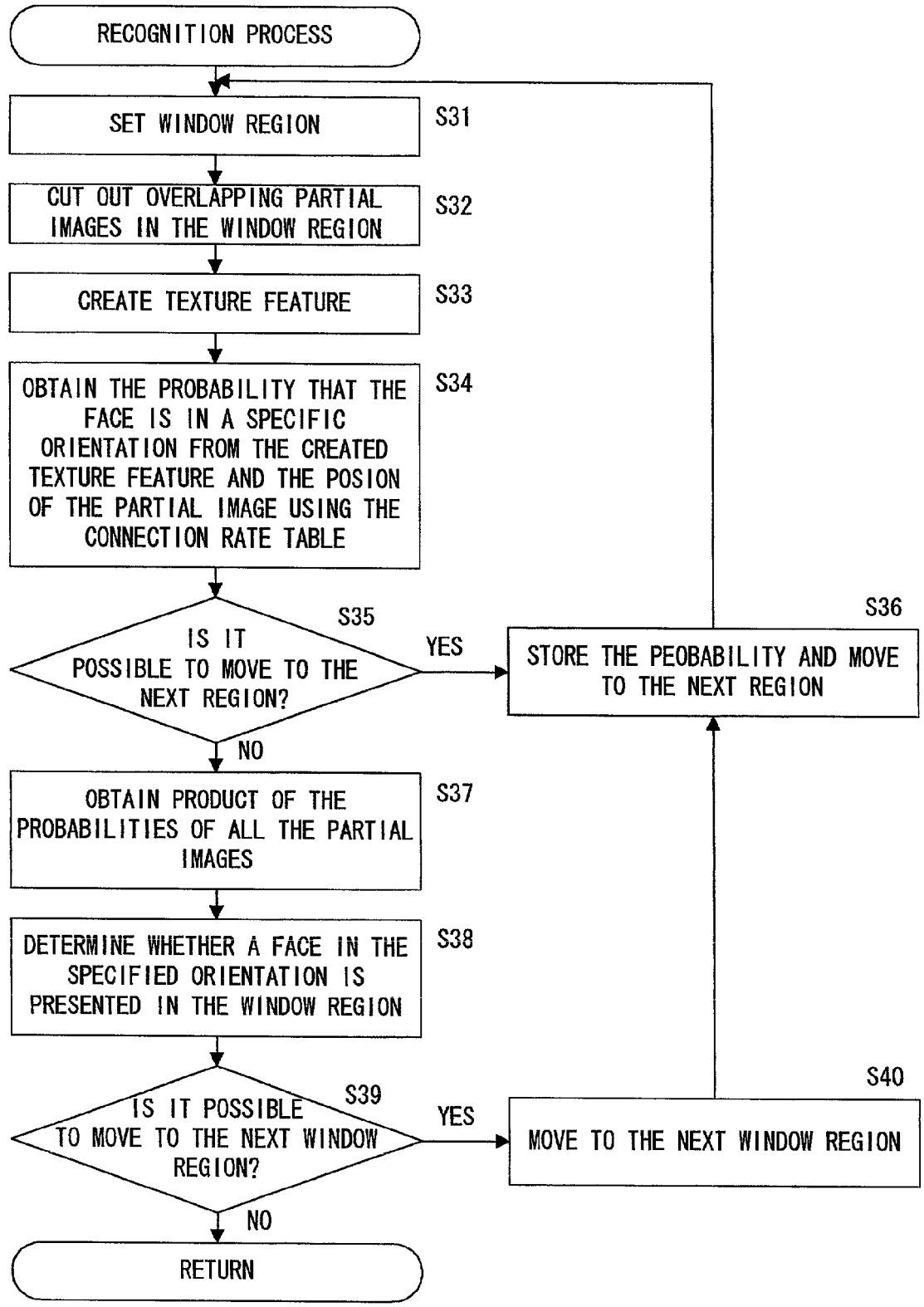
FIG. 9 is a flowchart of the recognition processing.

FIG. 8 is a schematic view of assistance in explaining the principle of the recognition processing. FIG. 9 is a flowchart of the recognition processing. Referring to FIGS. 8 and 9, a window region 311 is set in an input image 310 (step S31). The window region is a region included in the input image 310, and can be cut out arbitrarily.

Then, overlapping partial images 312 are cut out in the window region 311 (step S32). Then, a texture feature in a partial image 312 is created (step S33), and from the created texture feature and the position of the partial image in the window region 311, the probability that the face is in a specific orientation is obtained by use of the connection rate table created in the learning processing (step S34).

Then, whether it is possible to move to the next partial image or not is determined (step S35). When it is possible, the probability obtained at step S34 is stored, and after moving to the next partial image (step S36), the process proceeds to step S32.

When there is no partial image to which the process is to move, the product of the probabilities of all the partial images is obtained (step S37). This product is set as the likelihood of the window region 311. Then, from the obtained likelihood, whether a face in the specified orientation is present in the window region or not is determined (step S38).

Then, whether a window region to be set next is present in the input image 300 or not is determined (step S39). When a window region is present, the process proceeds to step S40, and when no window region is present, the process is ended. At step S40, the process moves to the next window region, and proceeds to step S31.

As described above, in the camera 100 of this embodiment, since picturization is performed when the face included in the input image is in a predetermined orientation, when a portrait of an infant or the like is taken, a natural facial expression of an infant whose face is in a desired orientation can be shot without a good moment to depress the shutter button being missed.

Moreover, since the user can follow the subject with attention only to situating the subject within the viewfinder in good balance, the subject can be shot with ease, and further, it is only when the subject is in a desired orientation that the shutter button is depressed. Consequently, even when the subject is moving fast, the subject can be shot without a good moment to depress the shutter button being missed.

[Second Embodiment]

A second embodiment is suitable for a case where the subject is a plurality of persons. Images including a plurality of persons' faces are successively captured by a digital camera. The orientations of the faces included in the captured images are successively detected. When a predetermined number of faces are in a desired orientation, the images are recorded onto a recording medium.

Figure 10:
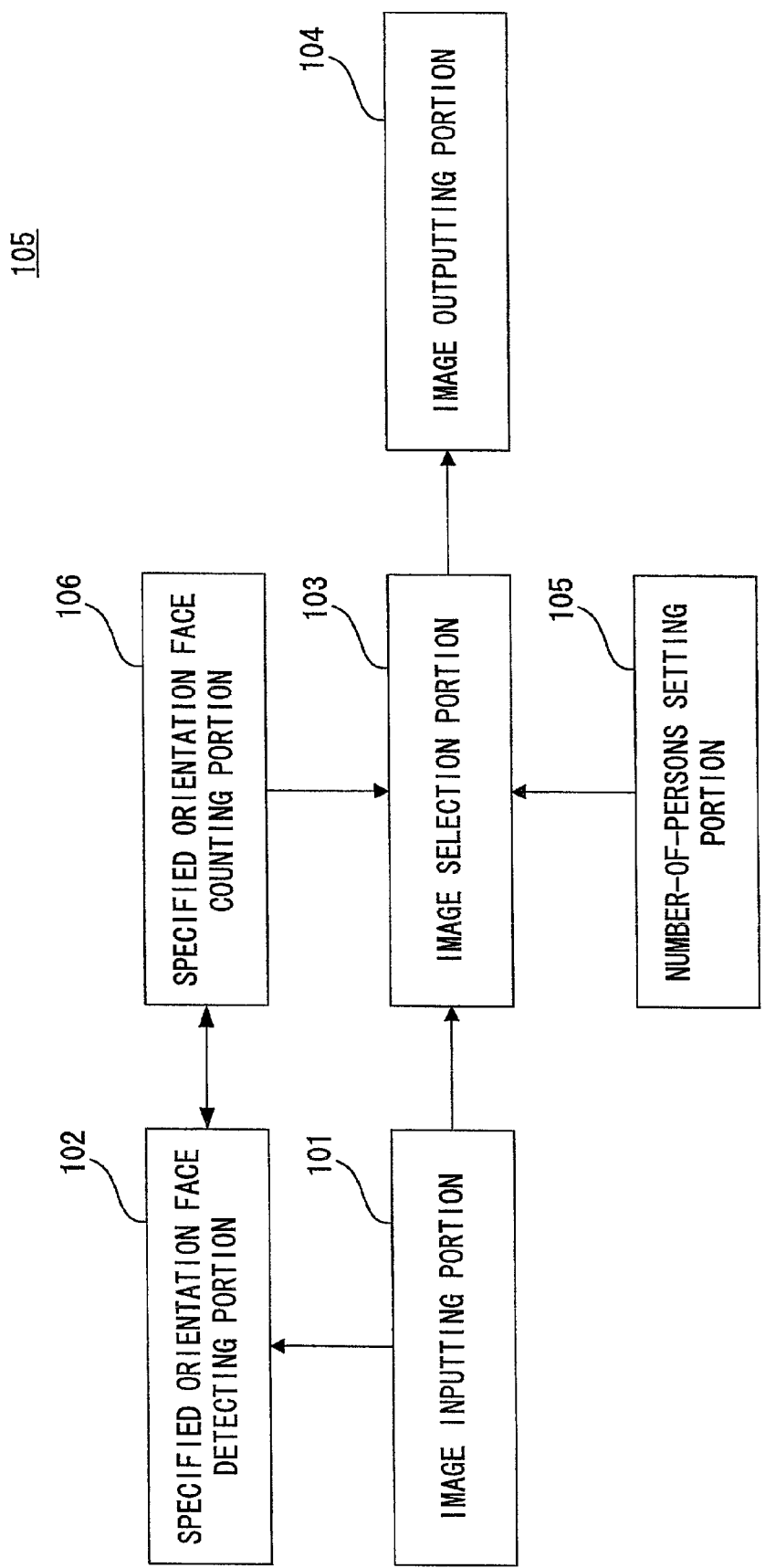
FIG. 10 is a function block diagram showing functions of a camera of a second embodiment.

FIG. 10 is a function block diagram of assistance in explaining functions of a camera 150 of the second embodiment. Referring to FIG. 10, the camera 150 of the second embodiment includes an image inputting portion 101 for inputting images, a specified orientation face detecting portion 102 connected to the image inputting portion and for detecting faces in a specified orientation from images included in an input image, a specified orientation face counting portion 106 for counting the number of faces in the specified orientation, an image selecting portion 103 for selecting the image input by the image inputting portion 101 when a predetermined number of faces are in the specified orientation, a number-of-persons setting portion 105 for inputting a condition for selecting an image by the image selecting portion 103, and an image outputting portion 104 for outputting the selected image.

The camera 150 of the second embodiment is the camera 100 of the first embodiment to which the specified orientation face counting portion 106 and the number-of-persons counting portion 105 are added. The structure except this is similar to that of the camera 100 of the first embodiment, and therefore, the description thereof will not be repeated.

The number-of-persons setting portion 105 includes a number-of-persons setting button 7 and a part of the liquid crystal display 4. On the part of the liquid crystal display 4, a number in accordance with the number of depressions of the number-of-persons setting button 7 is displayed. The number displayed on the liquid crystal display 4 is set as the number of persons. The specified orientation face counting portion 106 counts the number of faces detected to be in the specified orientation by the specified orientation face detecting portion 102.

Figure 11:
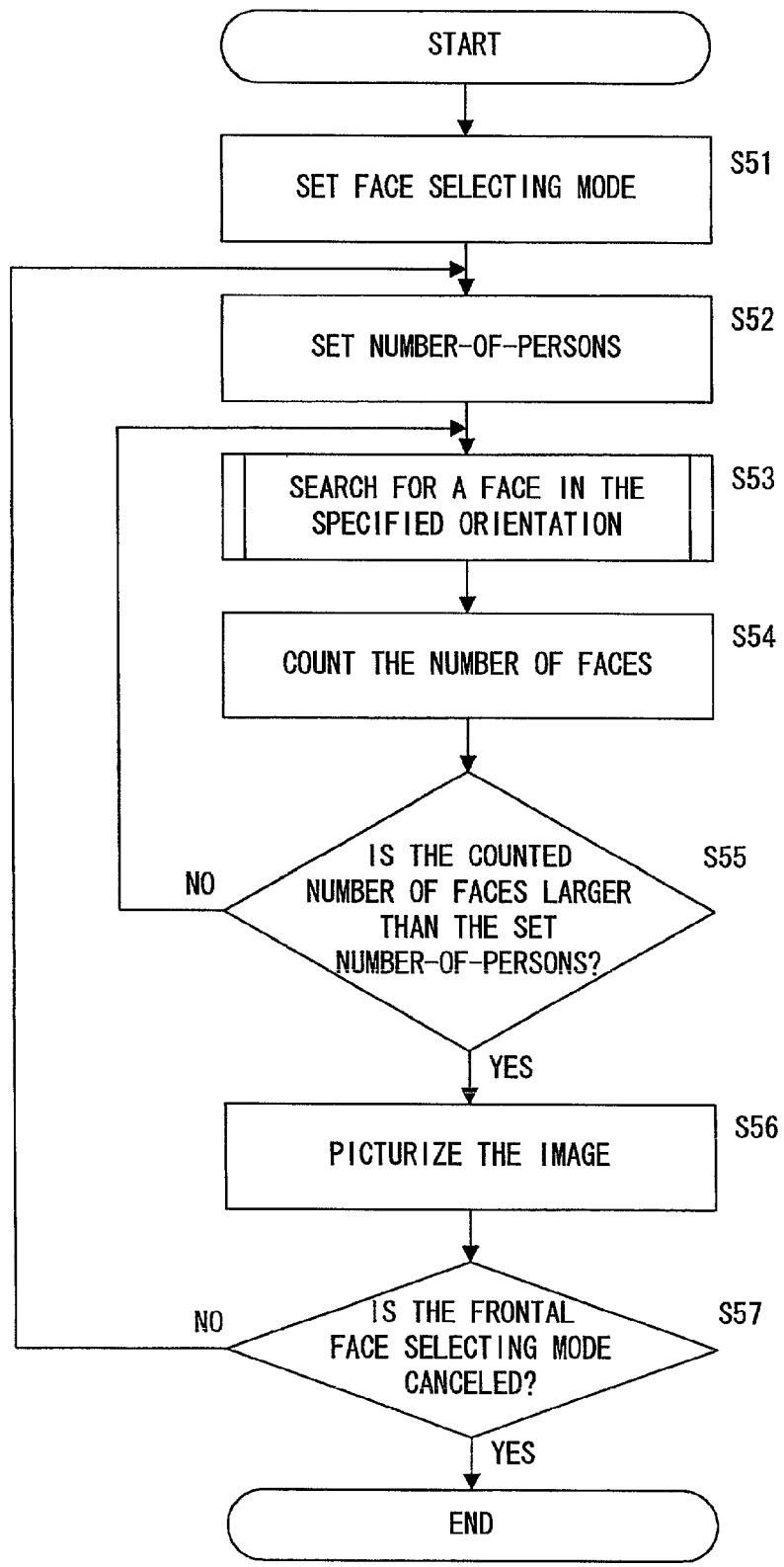
FIG. 11 is a flowchart of a picturization processing performed when a camera 150 of the second embodiment is in the face selecting mode.

FIG. 11 is a flowchart of a picturization processing performed when the camera 150 of the second embodiment is in the face selecting mode. When switching to the face selecting mode is made by depressing the function switching button 5, the camera 150 is placed in the face selecting mode (step S51).

When the camera 150 is placed in the face selecting mode, a region for displaying the number of persons is provided in a part of the liquid crystal display 4. Then, the number of persons can be set by depressing the number-of-persons button 7 (step S52). Then, by depressing the shutter button 2, the number displayed on the liquid crystal display 4 at that point of time is set as the number of persons. In this embodiment, the specified orientation is toward the front. The camera 150 may be structured so that the specified orientation is not limited to toward the front but various orientations can be specified.

At the next step S53, faces in the specified orientation, that is, looking toward the camera are searched for (step S53) At step S54, the number of faces looking toward the front among the faces included in the image is counted by the specified orientation face counting portion 106 (step S54). Then, it is determined whether or not the number of faces counted by the specified orientation face counting portion 106 is equal to or larger than the number of persons set by the number-of-persons setting portion 105 (step S55). When the counted number is equal to or larger than the set number of persons, the process proceeds to step S56, where the image is selected and output to the image outputting portion 104. When the counted number is smaller than the set number of persons, the process proceeds to step S53 to repeat the above-described processing on an image newly input from the image inputting portion 101.

At step S57, whether the face selecting mode (frontal face selecting mode) is canceled or not is determined. When it is canceled, the processing is ended, and when it is not canceled, the process proceeds to step S52 to repeat the above-described processing. The face selecting mode is canceled on condition that a predetermined time has elapsed or that shooting has been performed a predetermined number of times.

As described above, the camera 150 of the second embodiment is effective when the self-timer function is used in taking a group photo on an occasion such as a group trip. That is, shooting is performed by the camera when the user himself joins the group to be shot and of the persons included in the group, a specified number of persons face toward the front. By doing this, shooting can be performed without concern for time, although shooting is not performed until a predetermined time has elapsed according to the self-timer function.

Moreover, in a case where the user himself takes a picture with a camera, when the subject is a plurality of persons, a picture in which all the persons face toward the front can be taken by observing all the persons' poses and paying attention only to situating the subjects within the viewfinder in good balance when a picture in which all the persons face toward the front is taken.

While an example in which the present invention is applied to a shooting apparatus such as a camera is shown in this embodiment, the present invention is applicable to a case where a still image is extracted from a video-shot moving image.

Moreover, it is considered to use the present invention for image search of an image database or the like. For example, it is possible to extract an image including a person whose head is turned through a specific angle or to perform an image search with an image including three persons in a specific orientation with the keyword.

[Embodiment]

A third embodiment is suitable for extracting a predetermined image from an image database containing images of persons' faces. A determination is made on each of the images stored in the database, and from among the images, an image in which the person's face is in a desired orientation is extracted.

Figure 12:
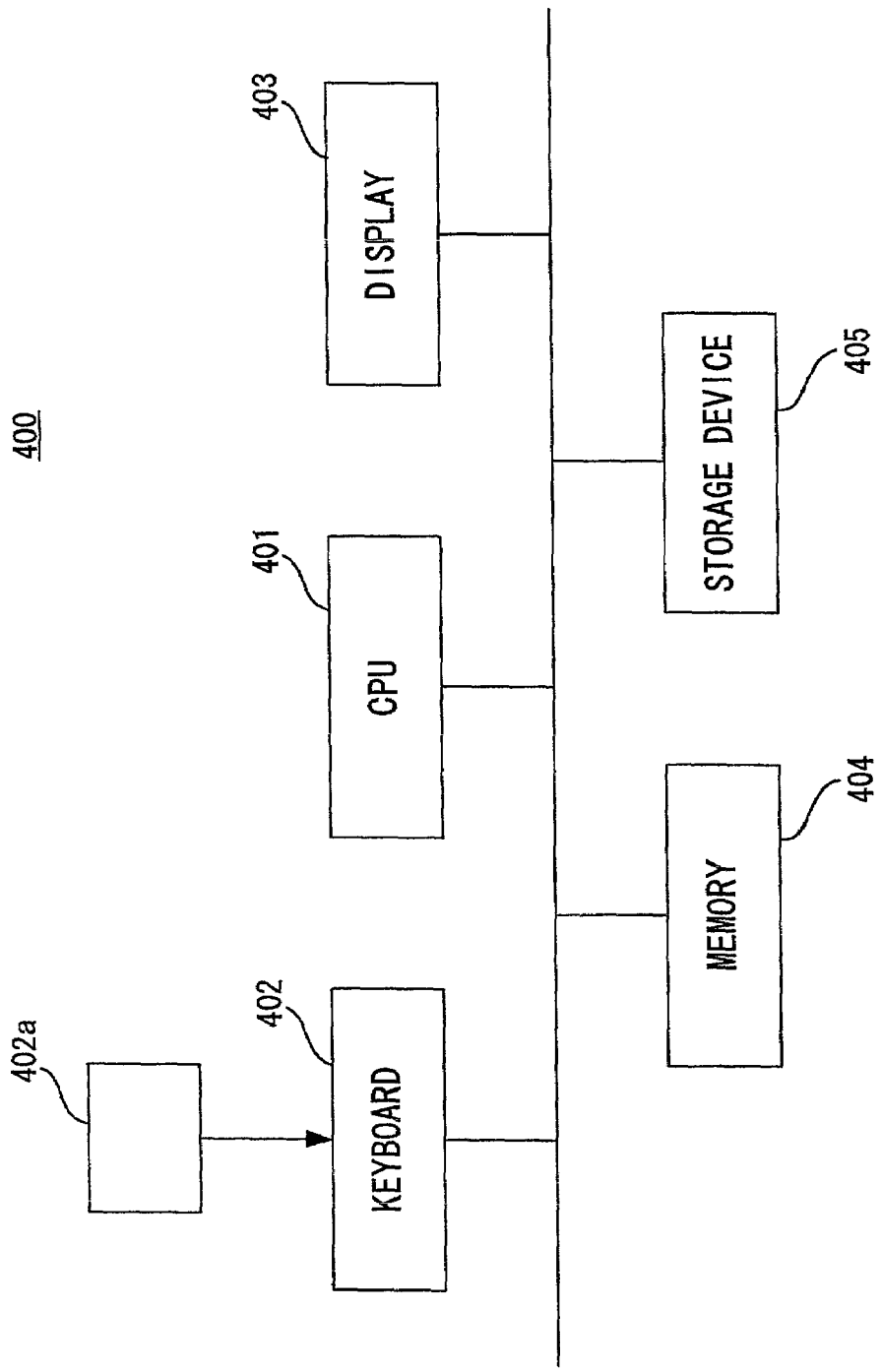
FIG. 12 is a block diagram schematically showing the structure of an image extracting apparatus 400 of a third embodiment.

An image extracting apparatus of the third embodiment will be described. FIG. 12 is a block diagram schematically showing the structure of the image extracting apparatus 400 of the third embodiment. Referring to FIG. 12, the image extracting apparatus 400 includes a central processing unit (CPU) 401 for controlling the entire image extracting apparatus 400, a keyboard 402, a pointing device 402a, a display portion 403, a memory 404, and a storage device 405.

The pointing device 402a which is used together with a mouse is used for inputting data or inputting a search criterion for image search to the image extracting apparatus 400.

The display portion 403 which is a cathode ray tube (CRT) display or a liquid crystal display displays a user interface for drawing a screen rendered a search criterion, image data rendered a search result, and the like.

In the memory 404, programs to be executed by the CPU 401 and data necessary for executing the programs are stored. In the storage device 405, an image database containing a plurality of image data to be searched is stored.

Figure 13:
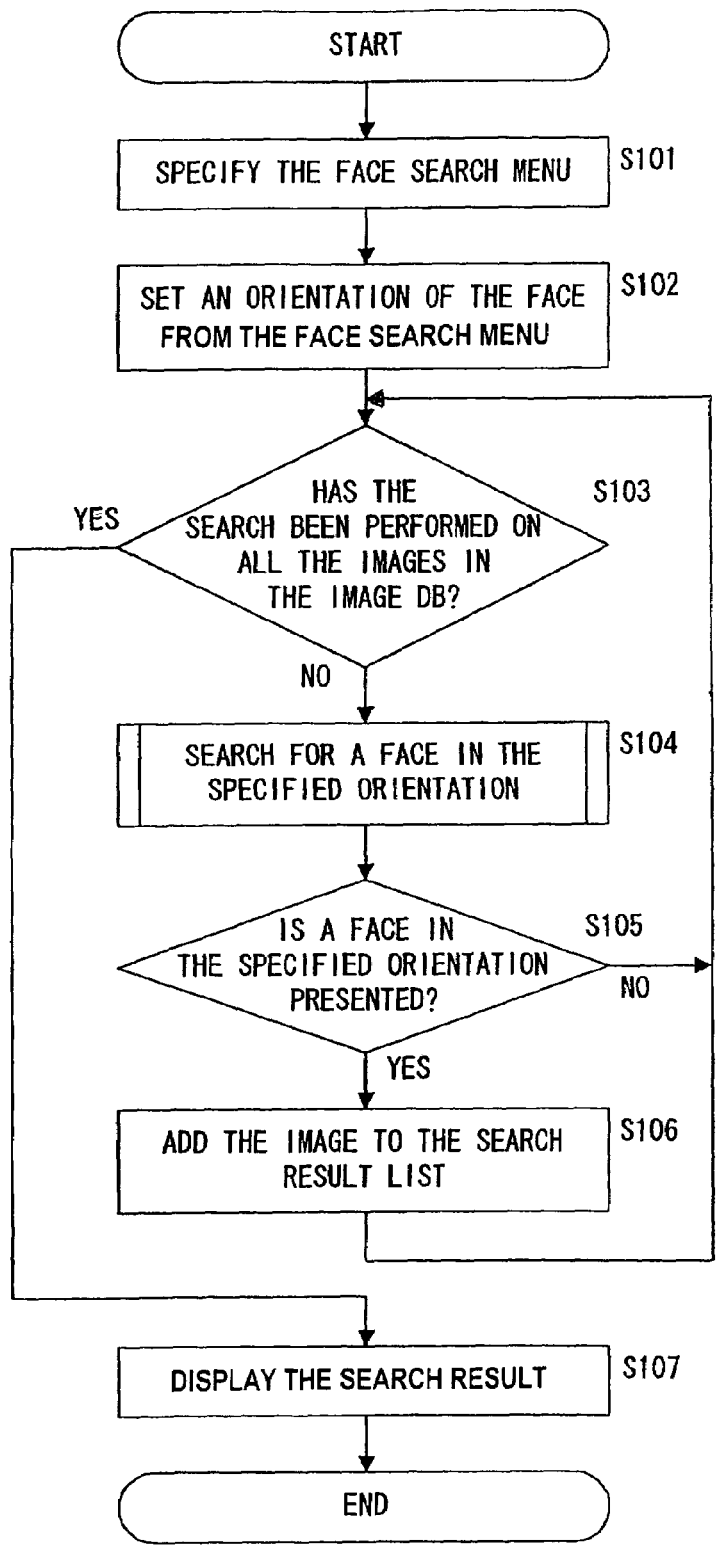
FIG. 13 is a flowchart of a processing performed by the image extracting apparatus of the third embodiment.

Next, a processing performed by the image extracting apparatus will be briefly described. FIG. 13 is a flowchart of the processing performed by the image extracting apparatus of the third embodiment. In this example, a case will be described where an image including a face in a certain orientation, for example, an image including a face looking toward the front is to be retrieved.

Referring to FIG. 13, the user specifies a face search menu with the keyboard 402 and the pointing device 402a of the image extracting apparatus 400 (step S101). The orientation of the face to be retrieved is set from the face search menu (step S102).

Whether the search has been performed on all the images in the image database stored in the storage device 405 or not is determined (step S103). When the search has been performed on all the images, the process proceeds to step S107, and when the search has not been performed on all the images, the process proceeds to step S104.

At step S104, a face in the specified orientation is searched for. For the search for a face in the specified orientation, the above-described technique using neural networks or technique using a probability model can be used. Then, whether a face in the specified orientation is present or not is determined (step S105). When such a face is present, the process proceeds to step S106, and when such a face is absent, the process returns to step S103.

At step S106, the image including a face in the specified orientation is added to the search result list as an image meeting the search criterion. Then, the process returns to step S103 to continue the search on all the images in the image database.

When it is determined at step S103 that the search has been performed on all the images in the image database, at step S107, the search result is displayed in image table or list form on the display portion 403, and the processing is ended.

Figure 14:
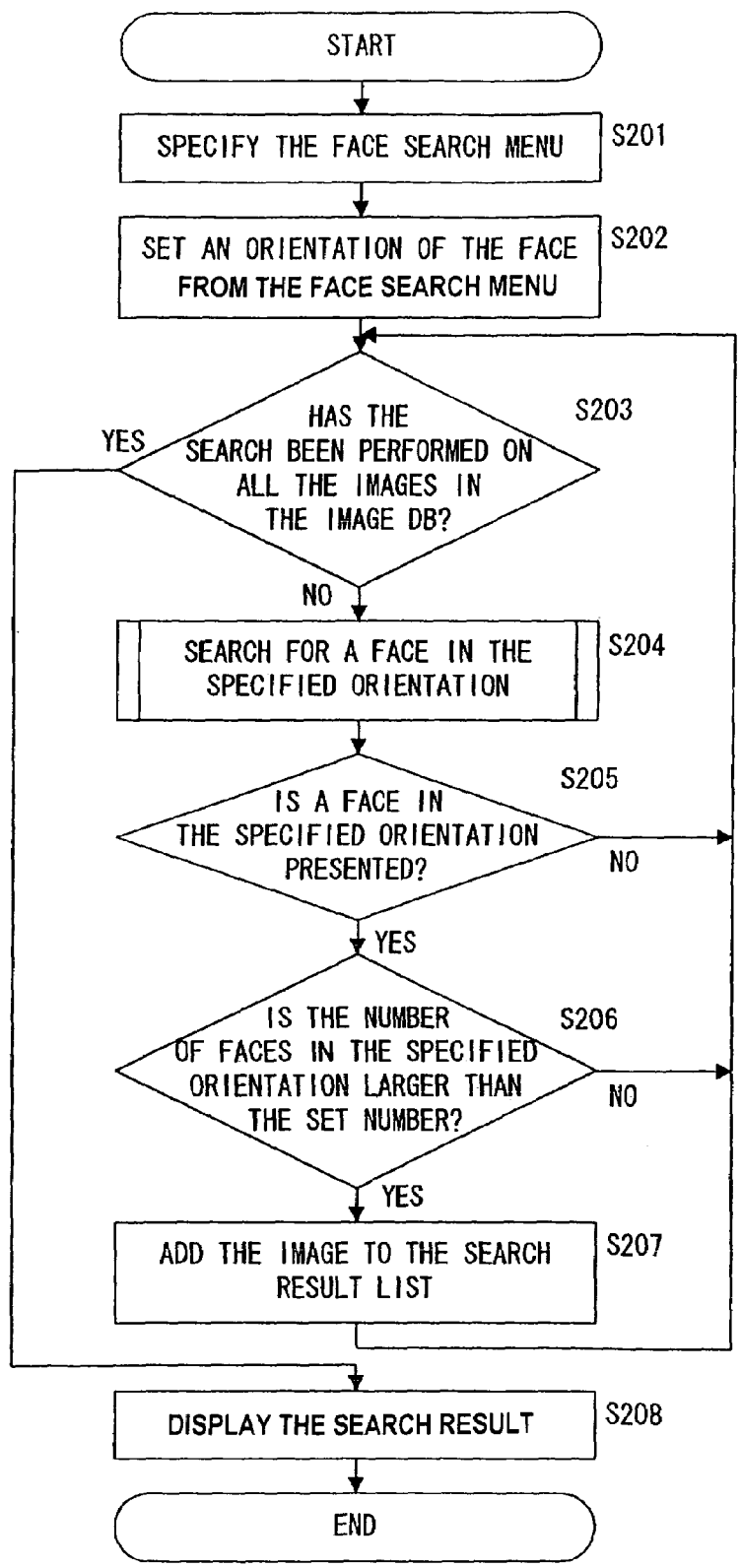
FIG. 14 is a flowchart of another processing performed by the image extracting apparatus of the third embodiment.

FIG. 14 is a flowchart of another processing performed by the image extracting apparatus of the third embodiment. In this example, a case will be described where an image including a specified number of faces in a specified orientation is to be retrieved when a plurality of faces is included in an image.

Referring to FIG. 14, the user specifies a face search menu with the keyboard 402 and the pointing device 402a of the image extracting apparatus 400 (step S201). By specifying the orientation of the faces to be retrieved and the number of faces in the orientation from the face search menu, the orientation and the number are set (step S202).

Whether the search has been performed on all the images in the image database stored in the storage device 405 or not is determined (step S203). When the search has been performed on all the images, the process proceeds to step S208, and when the search has not been performed on all the images, the process proceeds to step S204.

At step S204, faces in the specified orientation are searched for. For the search for faces in the specified orientation, the above-described technique using neural networks or technique using a probability model can be used. Then, whether faces in the specified orientation are present or not is determined (step S205). When such faces are present, the process proceeds to step S206, and when such faces are absent, the process returns to step S203.

At step S206, whether or not the number of faces in the specified orientation is equal to or larger than the number set at step S202 is determined. When the number of faces is equal to or larger than the set number, the process proceeds to step S207, and when the number of faces is smaller, the process proceeds to step S203.

At step S207, the image is added to the search result list as an image meeting the search criterion. Then, the process returns to step S203 to continue the search on all the images in the image database.

When it is determined at step S203 that the search has been performed on all the images in the image database, at step S208, the search result is displayed in image table or list form on the display portion 403, and the processing is ended.

As described above, with the image extracting apparatus 400 of the third embodiment, an image including a face in a predetermined orientation can be extracted from among the images stored in the image database. When a plurality of faces is included in an image, an image including a predetermined number of faces in a predetermined orientation can be extracted.

Moreover, by the storage device 405 of FIG. 12 being a recording and reproducing apparatus such as a video tape recorder, a desired image can be extracted from among the images recorded on the video tape recorder.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image extracting apparatus comprising:
    an image database containing a plurality of images of one or more subjects;
    a specifying device for specifying an orientation of the subject for searching an image including the subject in the specified orientation;
    a determining device for determining the orientation of the subject in the images contained in the image database;
    a searching device for searching the image including the subject in the specified orientation based on a result of the determining the orientation of the determining device, and
    a display device for displaying the search result of the searching device.

2. The image extracting apparatus according to claim 1, wherein the subject is a person's face.

3. The image extracting apparatus according to claim 2, wherein the specified orientation is a frontal face orientation.

4. The image extracting apparatus according to claim 1, wherein the specifying device further specifies a number of the subject in the specified orientation, and the searching device for searching the image in which the number of the subject in the specified orientation is equal to or larger than the specified number.

5. An image extracting method comprising the steps of:
    specifying an orientation of a subject for searching an image including the subject in the specified orientation;
    determining the orientation of the subject in the image contained in the image database containing a plurality of images of one or more subjects;
    searching an image including the subject in the specified orientation based on a result of the determining the orientation; and
    displaying the search result of the searching.

6. The image extracting method according to claim 5, wherein the subject is a person's face.

7. The image extracting method according to claim 6, wherein the specified orientation is a frontal face orientation.

8. The image extracting method according to claim 6, further comprising the steps of:
    specifying a number of the subject in the specified orientation, and
    searching the image in which the number of the subject in the specified orientation is equal to or larger than the specified number.

* * * * *